United States Patent Office 3,576,819
Patented Apr. 27, 1971

3,576,819
ESTERS OF α-(1-SUBSTITUTED-3-PYRROLIDINYL)-α-PHENYL ACETIC ACID
Carl Dalton Lunsford, Richmond, and Albert Duncan Cale, Jr., Mechanicsville, Va., assignors to A. H. Robins Company, Incorporated, Richmond, Va.
No Drawing. Filed Feb. 26, 1968, Ser. No. 707,945
Int. Cl. C07d 27/04
U.S. Cl. 260—326.3                    13 Claims

ABSTRACT OF THE DISCLOSURE

Lower alkyl esters of α-(1-substituted-3-pyrrolidinyl)-α-phenyl acetic acid are disclosed which possess analgetic activity.

---

The present invention relates to certain novel lower alkyl esters of α-(1-substituted-3-pyrrolidinyl)-α-phenyl acetic acid and processes for the preparation thereof.

The invention is especially concerned with novel lower alkyl esters of α-(1-substituted-3-pyrrolidinyl)-α-phenyl acetic acid having the formula

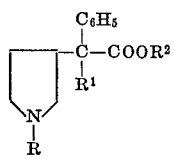

Formula I wherein;

R is lower-alkyl and cycloalkyl,
$R^1$ is hydrogen, lower-alkyl and phenyl,
$R^2$ is lower-alkyl, and acid addition salts thereof.

In structural Formula I given above, diastereoisomers exist for each structure when $R^1$ is not phenyl. These diastereoisomers, together with their optically active forms, are included within the scope of the present invention.

The compounds of Formula I were demonstrated to be useful analgetics in mice in accordance with the Nilsen experimental method [P. Nilsen, Acta. Phar. et Toxicol., 18, 10 (1961)], having a low order of toxicity in the desired therapeutic range.

It is, accordingly, an object of the present invention to provide novel lower alkyl esters of α-(1-substituted-3-pyrrolidinyl)-α-phenyl acetic acid. An additional object is the provision of such compounds having analgetic activity and which produce minimal side effects. A still further object is to provide a method for producing the novel lower alkyl esters of α-(1-substituted-3-pyrrolidinyl)-α-phenyl acetic acid. Additional objects will become apparent hereinafter and still others will become apparent to one skilled in the art.

In the definition of symbols in the foregoing Formula I and where they appear elsewhere throughout this specification, the terms have the following significance.

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isomyl, hexyl, heptyl, octyl and the like. A "lower alkoxy" group has the formula —O—lower alkyl.

The term "cycloalkyl" as used herein includes primarily cyclic radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl.

This invention also includes acid-addition salts of the above defined bases formed with nontoxic organic and inorganic acids. Such salts are easily prepared by methods known in the art. When the compounds are to be used as intermediates for preparing other compounds or for any other non-pharmaceutical use, the toxicity or non-toxicity of the salts is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred nontoxic acid-addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

It would be expected that the compounds of the present invention could be prepared by standard esterification procedure from the appropriate α-(3-pyrrolidinyl)-α-phenyl acetyl halide. However, such halides are sensitive to basic conditions, rearranging spontaneously, or nearly spontaneously to the 4-(omega-haloalkyl)-2-pyrrolidinones. However, if the acetyl halide is dissolved in the cold (10–15° C.) in an alcohol solvent, the alcohol containing the desired ester group radical and the alcohol solution added in the cold (10–15° C.) to a solution of the corresponding alkoxide, the desired ester is obtained as well as the aforementioned rearranged pyrrolidinone.

The active agents of the invention, the lower alkyl esters of an α-(1-substituted-3-pyrrolidinyl)-α-phenyl acetic acid are accordingly prepared by reacting an appropriate phenylacetonitrile of the formula:

(Formula II)

wherein $R^1$ has the value previously assigned, with a compound of the formula:

Z—X            (Formula III)

wherein Z is 1-substituted-3-pyrrolidinyl, and wherein X is a replaceable halogen atom, or an arylsulfonate radical such as the p-toluenesulfonate radical, or an alkylsulfonate radical such as the methane-sulfonate radical.

The α-(1-substituted-3-pyrrolidinyl) - α - phenylacetonitrile obtained as above and having the formula

(Formula IV)

is hydrolyzed in aqueous 70% sulfuric acid to the amino acid of the formula

(Formula V)

The amino acid of Formula V is converted to the acid chloride and an alcohol solution of the acid chlorine added to the appropriate alkoxide to give the desired ester of Formula I.

Alternatively, esterification is achieved by addition of the desired alcohol beneath the surface of the hot hydrolyzed acid mixture with continuous distillation and the ester isolated by basification of the esterification mixture and extraction with a suitable solvent.

1-substituted-3-halopyrrolidines which may be used as starting intermediates are those tertiary pyrrolidines which have a halogen bonded to the heterocyclic ring in the three position. A suitable method for the preparation of starting 1-substituted-3-halopyrrolidines is found in the Journal of Medical and Pharmaceutical Chemistry 2, 523(1960). Exemplary 1-substituted-3-pyrrolidinyl arylsulfonates and alkylsulfonates are 1-methyl-3-pyrrolidinyl benzenesulfonate, 1 - ethyl-3-pyrrolidinyl p-toluenesulfonate, 1-isopropyl-3-pyrrolidinyl methanesulfonate, and the like. Because of the reactivity of these intermediates they are most conveniently prepared in situ from the appropriate 1-substituted-3-pyrrolidinol and an aryl- or alkylsulfonyl halide. By way of example, sodium amide is reacted with an equimolar quantity of a 1-substituted-3-pyrrolidinol in a solvent which is inert under the reaction conditions, such as toluene, to form a sodium 1-substituted-3-pyrrolidinoxide salt which is then reacted with the aryl- or alkylsulfonyl halide to give the desired intermediate.

In a preferred procedure for carrying out the reactions given above, the starting phenylacetonitrile of Formula II is heated, generally to reflux, with an equimolar quantity of carbanion-forming reagent, preferbaly until the hydrogen replacement step is complete. By way of example, this is evidenced by cessation of ammonia evolution when sodium amide is used. The reaction is preferably conducted in the presence of an organic solvent which is inert to the reactants and reaction products under the conditions of reaction, such as an alkyl or aryl hydrocarbon; for example, benzene, xylene, toluene, hexane and the like. One to two liters of solvent per mole of starting acetonitrile is satisfactory, although the quantity of solvent may be varied over a much wider range. The halogenated, arylsulfonated, or alkylsulfonated reactant Z—X of Formula III is added to the resulting solution or suspension of the metal salt with stirring, usually in a dropwise manner at or about reflux, and the reaction is carried to completion by continued heating of the reaction mixture for from about four hours to about fifteen hours. In an alternate procedure, all the reactions are mixed at once and the reaction allowed to proceed to completion. The cooled reaction mixture is washed with water, the separated organic layer dried, the solvent evaporated and the residual α-(1-substituted-3-pyrrolidinyl)-α-phenyl acetonitrile distilled in vacuo.

The purified α-(1-substituted-3-pyrrolidinyl)-α-phenyl acetonitrile of Formula IV is admixed with 70% aqueous sulfuric acid generally in the ratio of one gram of acetonitrile per 5 grams of aqueous acid. The acid mixture is heated at 130–140° C. for about 48 hours, complete hydrolysis generally occurring. After cooling, the acidic solution is basified with 50% caustic solution and the mixture extracted with chloroform. The combined chloroform extracts are treated with dry hydrogen chloride until acidic, the chloroform removed in vacuo and the hydrochloride salt of the residual α-(1-substituted - 3-pyrrolidinyl)-α-phenyl acetic acid of Formula V dissolved in an excess amount of thionyl chloride. After standing at ambient temperature for a period from about 36 to about 60 hours, preferably about 48 hours, the excess thionyl chloride is removed at reduced pressure, keeping the solution as cool as possible. The residual α-(1-substituted-3-pyrrolidinyl)-α-phenyl acetyl chloride is dissolved in a selected alcohol and the alcohol solution added dropwise to a cold sodium alkoxide solution prepared from the selected alcohol. The lower alkyl ester thusly prepared is separated by dilution of the esterification mixture with water, ether extraction of the organic materials and dilute acid extraction of the ether extract to give an acid solution of the lower alkyl ester of α-(1-substituted-3-pyrrolidinyl)-α-phenyl acetic acid. The acid solution is basified, the base-insoluble oil separated and purified by distillation or by other suitable means, as, for example, conversion to an acid-addition salt which is further purified by crystallization.

The following examples and details are given by way of illustration only and are not to be construed as limiting.

EXAMPLE 1

Ethyl α,α-diphenyl-α-(1-ethyl-3-pyrrolidinyl)-acetate

To 500 g. of 70% sulfuric acid was added 100 g. (0.345 mole) of α,α-diphenyl-α-(1-ethyl-3-pyrrolidinyl)-acetonitrile with cooling. The mixture was heated at 120–160° C. (around 130° C. most of the time) for about 40 hours. The solution was poured on ice, made basic with sodium hydroxide, and extracted with chloroform. The chloroform layer was treated with hydrogen chloride gas until the solution became acidic. A small water layer which formed on top of the chloroform was separated and the chloroform layer dried over anhydrous sodium sulfate and concentrated. The residue was dissolved in 500 ml. of thionyl chloride and allowed to stand for 48 hours. About one half of the thionyl chloride solution was concentrated using a rotary vacuum evaporator, keeping the solution as cool as possible. The residue was dissolved in absolute ethanol which was cooled in an ice bath and the ethanol solution added dropwise to a cold (0–10° C.) solution of sodium ethoxide previously prepared by dissolving 46 g. (2 mole) of sodium in 1 liter of absolute ethanol. Stirring was continued for 20 minutes and then 500 ml. of water added slowly. The solution was extracted with 1 liter of ether. The ethereal solution was extracted with 1 liter of 1 N hydrochloric acid. The ethereal solution (A) was saved. The acid extract was made basic with sodium hydroxide and extracted with ether. The ethereal solution was dried with anhydrous sodium sulfate, concentrated, and the residue distilled; yield 29.5 g. (46%); B.P. 168–170° C./0.04 mm.

Analysis.—Calcd. for $C_{22}H_{27}NO_2$ (percent): C, 78.30; H, 8.07; N, 4.15. Found (percent): C, 78.48; H, 8.12; N, 4.41.

The ethereal solution (A) was concentrated and the residue crystallized from isopropyl ether yielding 6.0 g. (10%) of 4-(β-chloroethyl)-1-ethyl-3,3-diphenyl-2-pyrrolidinone.

EXAMPLE 2

Ethyl α,α-diphenyl-α-(1-isopropyl-3-pyrrolidinyl)-acetate

To 75 g. (0.243 mole) of α,α-diphenyl-α-(1-isopropyl-3-pyrrolidinyl)-acetonitrile was added 500 g. of 70% sulfuric acid. The mixture was heated at 130–140° C. for 48 hours, poured onto ice, the solution made basic using solid sodium hydroxide and the basic solution extracted with chloroform. Hydrogen chloride gas was passed into the separated chloroform layer until it became acidic. The chloroform solution was dried over sodium sulfate and concentrated. The residue was dissolved in 400 ml. of thionyl chloride and allowed to stand at room temperature for 48 hours. The excess thionyl chloride was removed using a rotary vacuum evaporator, keeping the solution as cool as possible. The oily residue was dissolved in 200 ml. of absolute ethanol with cooling in an ice bath and the ethanol solution was added dropwise to an ethanolic solution of sodium ethoxide previously prepared by dissolving 46 g. (2 mole) of sodium in 1500 ml. of absolute ethanol; the reaction was run at 10–15° C. When addition was complete the solution was stirred for about 30 minutes at room temperature followed by addition of about 2 liters of water. The aqueous solution was extracted with ligroin and then with chloroform. The ligroin was extracted with 1 liter of 3 N hydrochloric acid. The chloroform and ligroin solutions were combined and saved (solution A). The acid solution was made basic with sodium hydroxide and extracted with ether; the ethereal solution dried over sodium sulfate, and concentrated. The residue was distilled yielding 43 g. (50.5%) of a mobile oil; B.P. 172–174° C./0.03 mm.

*Analysis.*—Calcd. for $C_{23}H_{29}NO_2$ (percent): C, 78.59; H, 8.32; N, 3.99. Found (percent): C, 78.83; H, 8.48; N, 4.04.

4-(β-chloroethyl)-3,3-diphenyl-1-isopropyl-2-pyrrolidinone

Solution (A) was concentrated and the residue crystallized from isopropyl ether. Yield 19 g. (23%). Recrystallized from isopropyl ether. Yield 16 g. (18.6%).

*Analysis.*—Calcd. for $C_{21}H_{24}NOCl$ (percent): C, 73.77; H, 7.08; N, 4.10; Cl, 10.37. Found (percent): C, 73.52; H, 6.79; N, 4.16; Cl, 10.10.

EXAMPLE 3

Ethyl α,α-diphenyl-α-(1-isobutyl-3-pyrrolidinyl)-acetate fumarate

To 100 g. (0.312 mole) of α,α-diphenyl-α-(1-isobutyl-3-pyrrolidinyl)-acetonitrile was added 500 g. of 70% sulfuric acid with ice bath cooling. The mixture was shaken until solution was complete and then heated at 130–140° C. for 48 hours. The acidic solution was poured onto ice, made basic with sodium hydroxide and extracted with chloroform. The chloroform solution was treated with hydrogen chloride gas until it was acidic and dried over sodium sulfate. Approximately one-half of the dried chloroform solution was concentrated using the rotary evaporator. The residue was dissolved in 250 ml. of thionyl chloride and allowed to stand at room temperature for 48 hours. The excess thionyl chloride was removed using the rotary vacuum evaporator keeping the solution as cool as possible. The residue was dissolved in ethanol and cooled in an ice bath. This solution was added dropwise to a cold (15° C.) solution of sodium ethoxide previously prepared by dissolving 46 g. (2 mole) of sodium in 700 ml. of absolute ethanol. The solution was stirred for about 20 minutes and poured onto ice. The solution was extracted with chloroform and the chloroform layer was extracted with 3 N hydrochloric acid. The chloroform solution was concentrated and the residue dissolved in ether and extracted with the same acid solution used above. The ethereal layer (A) was saved. The acid layer was made basic with ammonium hydroxide, extracted with chloroform and dried over anhydrous sodium sulfate. The solution was concentrated and the residue distilled, yielding 21 g. (37%) of a mobile oil; B.P. 170–180° C./0.2 mm.

*Analysis.*—Calcd. for $C_{24}H_{31}NO_2$ (percent): C, 78.86; H, 8.55; N, 3.83. Found (percent): C, 79.05; H, 8.74; N, 3.96.

A solution of 18 g. (0.05 mole) of the base in 150 ml. of absolute ethanol was added to 3.5 g. (0.03 mole) of fumaric acid. The mixture was boiled to bring about solution and placed in the freezer (−18° C.). The solution yielded 7 g. of white crystals and the filtrate was concentrated to one-half volume yielding 5 g. more. Recrystallization from methyl-isobutyl ketone yielded 10 g. (69%) of the fumarate salt; M.P. 152–153° C.

*Analysis.*—Calcd. for $C_{28}H_{35}NO_6$ (percent): C, 69.83; H, 7.33; N, 2.91. Found (percent): C, 69.45; H, 7.36; N, 2.86.

On concentrating etheral solution (A) and crystallization of the residue from isopropyl ether, 18 g. (32.5%) of 4-(β-chloroethyl)-3,3-diphenyl-1-isobutyl-2-pyrrolidinone was obtained.

EXAMPLE 4

Ethyl α-(1-ethyl-3-pyrrolidinyl)-α-ethyl-α-phenyl acetate

A mixture of 41 g. of α-(1-ethyl-3-pyrrolidinyl)-α-ethyl-α-phenyl acetonitrile and 200 g. of 70% sulfuric acid was stirred and heated at 130° C. for 48 hours. Absolute ethanol (600 ml.) was then added to the mixture below the surface of the solution while ethanol and water was continuously distilled from the reaction flask over a period of four hours. The reaction mixture was poured onto cracked ice and made basic in the cold with 50% sodium hydroxide solution. After the aqueous suspension was extracted with ether, the combined ether extracts were washed with water and the solvent evaporated at reduced pressure. The residual oil was distilled at reduced pressure and the fraction boiling at 160–108° C./.01 mm. collected. The water-white, non-viscous oil weighed 11.5 g. (24% yield). The product was redistilled slowly and the fraction boiling at 103–104° C./.01 mm. collected (7.5 g.). The oil was redistilled on the spinning band column and the fraction boiling at 89–92° C./.001 mm. collected.

*Analysis.*—Calcd. for $C_{18}H_{27}NO_2$ (percent): C, 74.70; H, 9.40; N, 4.84. Found (percent): C, 74.97; H, 9.41; N, 5.08.

EXAMPLE 5

Ethyl α-(1-cyclohexyl-3-pyrrolidinyl)-α,α-diphenyl acetate

To 500 g. of 70% sulfuric acid was added 77 g. (0.223 mole) of α-(1-cyclohexyl-3-pyrrolidinyl)-α,α-diphenyl-acetonitrile. After shaking to effect complete solution, the temperature of the reaction mixture was increased to 130–140° C. and maintained at that temperature for 48 hours. The acidic solution was poured carefully onto cracked ice and the dilute acid solution basified using sodium hydroxide. The basic solution was extracted with chloroform, the chloroform extracts combined and treated with hydrogen chloride gas until the chloroform solution was acidic. The chloroform solution was dried over sodium sulfate, concentrated and the residue dissolved in 400 ml. of thionyl chloride; the latter solution was allowed to stand 48 hours at room temperature. The solution was concentrated at reduced pressure and the residue dissolved in 200 ml. of cold (10–15° C.) ethanol. The cold ethanol solution was added dropwise to a sodium ethoxide solution (46.0 g. sodium in 1500 ml. of absolute ethanol) maintained at 10–15° C. After addition the solution was stirred 0.5 hr. at room temperature and then treated with 2 liters of water. The aqueous solution was extracted with ligroin and the ligroin extract combined and extracted with 3 N hydrochloric acid. The hydrochloric salt of the ester separated as an oil which was insoluble in the 3 N hydrochloric acid. The oily hydrochloride salt was converted to the free base; distillation of the base gave 32.0 g. (36.6%) of mobile oil which distilled at 210–215° C./0.15 mm.

*Analysis.*—Calcd. for $C_{22}H_{33}NO_2$ (percent): C, 79.75; H, 8.49; N, 3.58. Found (percent): C, 79.88; H, 8.35; N, 3.83.

4-(β-chloroethyl)-1-cyclohexyl-3,3-diphenyl-2-pyrrolidinone

The ligroin solution was concentrated to give 15 g. (17%) of crude 2-pyrrolidinone. Recrystallization of the crude material from isopropyl ether gave 11.0 g. (13%) of 4-(β-cloroethyl) - 1 - cyclohexyl - 3,3 - diphenyl-2-pyrrolidinone melting at 151–152° C.

*Analysis.*—Calcd. for $C_{24}H_{28}ClNO$ (percent): C, 75.47; H, 7.39; N, 3.67; Cl, 9.28. Found (percent): C, 75.50; H, 7.86; N, 3.82; Cl, 9.05.

EXAMPLE 6

Ethyl α,α-diphenyl-α-(1-methyl-3-pyrrolidinyl)-acetate

Using the procedure of Example 5, 71.0 g. (0.257 mole) of α,α-diphenyl - α - (1 - methyl - 3 - pyrrolidinyl)-acetonitrile was converted to α,α-diphenyl - α - (1 - methyl-3-pyrrolidinyl)-acetic acid. The acid hydrolyzate was made basic and extracted with chloroform. It was found that the sodium salt of the acid was insoluble in chlorofrom and that the hydrochloric acid addition salt was also insoluble in chloroform and in water. The oily water-insoluble α,α-diphenyl-α-(1 - methyl - 3 - pyrrolidinyl)-acetic acid hydrochloride was converted to the acid chloride and then esterified as in Example 5. The isolated crude ester was distilled to give 21.0 g. (25%) of product having B.P. 166–168° C./0.03 mm.

Analysis.—Calcd. for $C_{21}H_{25}NO_2$ (percent): C, 77.98; H, 7.79; N, 4.33. Found (percent): C, 78.14; H, 7.62; N, 4.30.

4-(β-chloroethyl)-3,3-diphenyl-1-methyl-2-pyrrolidinone

The chloroform extract of the basic hydrolyzate was concentrated to give 11.0 g. (13.2%) of crude 2-pyrrolidinone. The crude material was recrystallized from isopropyl ether to give 7.5 g. (9.3%) of pure material melting at 136–138° C.

Analysis.—Calcd. for $C_{19}H_{20}ClNO$ (percent): C, 72.71; H, 6.42; N, 4.46; Cl, 11.30. Found (percent): C, 72.87; H, 6.44; N, 4.48; Cl, 11.05.

EXAMPLE 7

Methyl α-(1-isopropyl-3-pyrrolidinyl)-α-phenyl acetate

A solution of 93.0 g. (0.405 mole) of α-(1-isopropyl-3-pyrrolidinyl)-α-phenyl acetonitrile in 500 g. of 70% sulfuric acid was heated at 130° C. for 48 hours. The solution was cooled to 95° C. and 400 ml. of methanol added slowly beneath the surface of the liquid with continuous distillation. The pot residue was poured onto ice, the cold solution basified using solid caustic and the basic solution extracted with chloroform. The chloroform extract was dried over sodium sulfate, concentrated, and the residual oil distilled. Eighty-four grams (79.0%) of colorless oil was collected at 160–162° C./0.03 mm.

EXAMPLE 8

Beta isomer of methyl α-(1-isopropyl-3-pyrrolidinyl)-α-phenyl acetate hydrochloride A solution of ten grams of methyl α-(1-isopropyl-3-pyrrolidinyl)-α-phenyl acetate in 50 ml. of isobutyl methyl ketone was heated to the boiling point and treated with 50 ml. of isobutyl methyl ketone containing 2.0 g. of hydrogen chloride. The solution was allowed to cool and a crop of crystals (5.0 g.) collected and dried; the crystals melted at 137–152° C. The crystalline material was recrystallized three times from isobutyl methyl ketone to give 1.5 g. of crystals melting at 172.5–174° C.

Analysis.—Calculated for $C_{16}H_{23}NO_2 \cdot HCl$ (percent): C, 64.52; H, 8.12; N, 4.70. Found (percent): C, 64.47; H, 8.18; N, 4.64.

EXAMPLE 9

Alpha isomer of methyl α-(1-isopropyl-3-pyrrolidinyl)-α-phenyl acetate

The isobutyl methyl ketone filtrate from Example 8 was concentrated and the residual crystalline mass recrystallized four times from ethyl acetate. The 0.9 g. of material melted at 159–161° C. A mixture melting point of the alpha and beta isomer melted at 145–152° C.

Analysis.—Calculated for $C_{16}H_{23}NO_2 \cdot HCl$ (percent): C, 64.52; H, 8.12; N, 4.70. Found (percent): C, 64.55; H, 8.12; N, 4.76.

As indicated above, the compounds hereinabove described were tested in mice for their analgetic activity according to the procedure of P. Nilsen, Acta. Phar. et Toxicol, 18, 10 (1961). In all of the analgetic tests performed according to the above referred-to method, the compounds were given to mice and determined to be effective at a dose level of 20 mg. per kg. intraperitoneally. At this dose level, the compound of Example 5 protected 5 out of 10 mice tested, and the compounds of Examples 1, 8, and 9 protected 2 out of 5 mice tested. The other compounds of Formula I, being less active, required higher dose levels to be effective, ranging between 20 and 60 mg./kg.

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic, and silicic acids, magnesium stearate, and polyvinyl pyrrolidone.

For parenteral administration, the carrier or excipient may be a sterile, parenterally acceptable liquid; e.g., water or a parenterally acceptable oil; e.g., arachis oil, contained in ampules.

Advantageously, the compositions may be formulated as dosage units, each unit being adapted to supply a fixed dose of active ingredients. Tablets, capsules, coated tablets and ampules are examples of preferred dosage unit forms according to the invention. Each dosage unit adapted for oral administration can conveniently contain 5 to 500 mg. and preferably 20 to 200 mg. of the active ingredient, whereas each dosage unit adapted for imtramuscular administration can conveniently contain 10 to 150 mg. and preferably 25 to 100 mg. of the active ingredient.

The following formulations are representative for all of the pharmacologically active compounds of the invention, but have been particularly designed to embody as active ingredient a lower alkyl ester of an α-(1-substituted-3-pyrrolidinyl)-α-phenyl acetic acid, and especially a pharmacologically acceptable salt thereof, for example, ethyl α-(1 - cyclohexyl-3-pyrrolidinyl)-α,α-diphenyl acetate as its fumarate, hydrochloride or like pharmacologically acceptable salt.

(1) Capsules.—Capsules of 5, 25, and 50 mg. of active ingredient per capsule are prepared. With the higher amounts of active ingredient, reduction may be made in the amount of lactose.

Typical blend for encapsulation:

| | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

(2) Tablets.—A typical formulation for a tablet containing 5 mg. of active ingredient per tablet follows. The formulation may be used for other strengths of active ingredient by adjust-of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend (1), (2), (4) and (5). Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 mg. tablet

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable-2% sterile solution: Per cc.
    Active Ingredient, mg. _____ 20
    Preservative, e.g., chlorobutanol, percent weight/volume _____ 0.5
    Water for injection, q.s.

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:

1. A compound selected from (a) compounds having the formula:

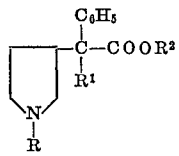

wherein;

R is selected from the group consisting of lower alkyl and cycloalkyl containing three to nine carbon atoms,
$R^1$ is selected from the group consisting of hydrogen, lower alkyl and phenyl,
$R^2$ is lower alkyl, and
(b) acid addition salts thereof.

2. A compound according to claim 1 which is a lower alkyl ester of α-(1-lower alkyl-3-pyrrolidinyl)-α-phenyl acetic acid.

3. A compound according to claim 1 which is a lower alkyl ester of α-(1-isopropyl-3-pyrrolidinyl)-α-phenyl acetic acid.

4. A compound according to claim 1 which is a lower alkyl ester of α-(1-ethyl-3-pyrrolidinyl)-α-ethyl-α-phenyl acetic acid.

5. A compound according to claim 1 which is a lower alkyl ester of α-(1-isopropyl-3-pyrrolidinyl)-α,α-diphenyl acetic acid.

6. A compound according to claim 1 which is ethyl α-(1-isobutyl-3-pyrrolidinyl)-α,α-diphenyl acetate.

7. A compound according to claim 1 which is ethyl α-(1-isopropyl-3-pyrrolidinyl)-α,α-diphenyl acetate.

8. A compound according to claim 1 which is ethyl α-(1-methyl-3-pyrrolidinyl)-α,α-diphenyl acetate.

9. A compound according to claim 1 which is ethyl α-(1-cyclohexyl-3-pyrrolidinyl)-α,α-diphenyl acetate.

10. A compound according to claim 1 which is ethyl α-(1-ethyl-3-pyrrolidinyl)-α,α-diphenyl acetate.

11. A compound according to claim 1 which is methyl α-(1-isopropyl-3-pyrrolidinyl)-α-phenyl acetate.

12. A compound according to claim 1 which is ethyl α-(1-ethyl-3-pyrrolidinyl)-α-ethyl-α-phenyl acetate.

13. A process for preparing lower alkyl esters of α-(1-substituted-3-pyrrolidinyl)acetic acids having the formula

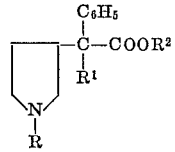

wherein;

R is selected from the group consisting of lower alkyl and cycloalkyl containing three to nine carbon atoms,
$R^1$ is selected from the group consisting of hydrogen, lower alkyl and phenyl, and
$R^2$ is lower alkyl,
which comprises the steps of:

(1) halogenating an α-(1-substituted - 3 - pyrrolidinyl)acetic acid having the formula

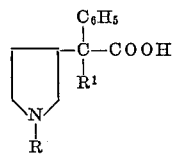

wherein R and $R^1$ have the values assigned above with a thionyl halide at ambient temperature to form an α-(1-substituted - 3 - pyrrolidinyl)acetyl halide having the formula

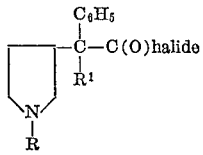

wherein R and $R^1$ are as defined above, and (2) Esterifying the α-(1-substituted-3-pyrrolidinyl) acetyl halide prepared in step (1) by adding an alcoholic solution of the acetyl halide maintained at 10–15° C. to an alkoxide solution maintained at 10–15° C. wherein the alkyl moiety of the alkoxide and the alkyl moiety of the alcohol of the alcoholic solution are the same to form an ester having the formula

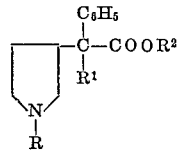

wherein R, $R^1$ and $R^2$ are as defined above.

References Cited

Migrdichian: Chem. of Org. Cyanogen Compounds (1947), pp. 269–70.

Nuller: Chemistry of Organic Compounds, 3rd ed. (1965), pp. 182, 183, 189, 190.

AXEL MAZEL, Primary Examiner

J. A. NARCAVAGE, Assistant Examiner

U.S. Cl. X.R.

424—274